US010469007B2

(12) United States Patent
Nayfeh et al.

(10) Patent No.: US 10,469,007 B2
(45) Date of Patent: Nov. 5, 2019

(54) HYBRID POWER SYSTEM CHARACTERIZATION

(71) Applicant: Top Flight Technologies, Inc., Malden, MA (US)

(72) Inventors: Samir Nayfeh, Shrewsbury, MA (US); Julian Lemus, Somerville, MA (US); Soojae Jung, Malden, MA (US); Matthew Sweetland, Bedford, MA (US); Long N. Phan, Somerville, MA (US)

(73) Assignee: Top Flight Technologies, Inc., Malden, MA (US)

( * ) Notice: Subject to any disclaimer, the term of this patent is extended or adjusted under 35 U.S.C. 154(b) by 0 days.

(21) Appl. No.: 15/787,911

(22) Filed: Oct. 19, 2017

(65) Prior Publication Data

US 2018/0115265 A1 Apr. 26, 2018

Related U.S. Application Data

(60) Provisional application No. 62/410,632, filed on Oct. 20, 2016.

(51) Int. Cl.
*H02P 6/34* (2016.01)
*H02K 11/24* (2016.01)
(Continued)

(52) U.S. Cl.
CPC .................. *H02P 6/34* (2016.02); *B60K 6/24* (2013.01); *B60K 6/26* (2013.01); *B60K 6/40* (2013.01); *B60W 20/10* (2013.01); *B64C 39/024* (2013.01); *B64D 27/24* (2013.01); *B64F 5/60* (2017.01); *G01L 5/13* (2013.01); *G01M 15/04* (2013.01); *G01M 15/05* (2013.01); *H02K 11/24* (2016.01); *H02P 9/04* (2013.01); *B60W 2050/0026* (2013.01); *B60Y 2200/50* (2013.01); *B60Y 2200/92* (2013.01); *B60Y 2300/60* (2013.01); *B60Y 2400/604* (2013.01); *B60Y 2400/61* (2013.01); *B64C 2201/027* (2013.01);
(Continued)

(58) Field of Classification Search
CPC .. H02K 11/24; H02P 6/34; B60K 6/24; B60K 6/26; B60K 6/40
See application file for complete search history.

(56) References Cited

U.S. PATENT DOCUMENTS 3,891,908 A * 6/1975 Porras .................. F16K 31/046
318/434
4,669,318 A * 6/1987 Angstrom ......... G01M 17/0072
73/862.09
(Continued)

OTHER PUBLICATIONS

"Acoustic and dynamic mechanical properties of a polyurethane rubber", The Journal of the Acoustical Society of America, 2002.*
(Continued)

*Primary Examiner* — Sean Gugger
(74) *Attorney, Agent, or Firm* — Fish & Richardson P.C.

(57) ABSTRACT

A system includes a torque sensor; and a hybrid power system. The hybrid power sensor includes a frame; an engine mounted on the frame; and a generator, the generator including: a generator rotor mechanically coupled to a shaft of the engine; and a generator stator coupled to the frame by the torque sensor. The torque sensor is configured to measure a torque on the generator stator.

30 Claims, 12 Drawing Sheets

(51) Int. Cl.

| | | |
|---|---|---|
| *B64C 39/02* | (2006.01) | |
| *B64D 27/24* | (2006.01) | |
| *B64F 5/60* | (2017.01) | |
| *B60K 6/26* | (2007.10) | |
| *B60K 6/24* | (2007.10) | |
| *B60K 6/40* | (2007.10) | |
| *B60W 20/10* | (2016.01) | |
| *H02P 9/04* | (2006.01) | |
| *G01M 15/04* | (2006.01) | |
| *G01M 15/05* | (2006.01) | |
| *G01L 5/13* | (2006.01) | |
| *B60W 50/00* | (2006.01) | |
| *B64D 27/02* | (2006.01) | |
| *F16C 1/02* | (2006.01) | |

(52) U.S. Cl.
CPC .. *B64C 2201/042* (2013.01); *B64C 2201/044* (2013.01); *B64C 2201/108* (2013.01); *B64D 2027/026* (2013.01); *F16C 1/02* (2013.01); *Y02T 50/44* (2013.01); *Y02T 50/64* (2013.01); *Y10S 903/905* (2013.01); *Y10S 903/906* (2013.01); *Y10S 903/951* (2013.01)

(56) References Cited

U.S. PATENT DOCUMENTS

| | | | | |
|---|---|---|---|---|
| 5,698,905 | A * | 12/1997 | Ruthlein | B60K 6/46 290/32 |
| 6,123,163 | A * | 9/2000 | Otsu | B60K 6/36 180/65.8 |
| 7,044,003 | B2 * | 5/2006 | Flammer | G01L 5/26 73/862.26 |
| 2005/0046191 | A1 * | 3/2005 | Cole | H02K 1/2786 290/1 A |
| 2007/0227470 | A1 * | 10/2007 | Cole | H02K 1/2786 123/3 |
| 2010/0147993 | A1 * | 6/2010 | Annati | B64C 27/20 244/12.2 |
| 2010/0237629 | A1 * | 9/2010 | Gray | F16C 32/044 290/1 R |
| 2012/0056040 | A1 * | 3/2012 | Brotherton-Ratcliffe | B64C 27/20 244/23 A |
| 2013/0221677 | A1 * | 8/2013 | Hinken | F03D 11/0075 290/55 |
| 2013/0226386 | A1 * | 8/2013 | Kawai | B60K 6/445 701/22 |
| 2015/0002056 | A1 * | 1/2015 | Young | B60W 10/26 318/376 |
| 2015/0113996 | A1 * | 4/2015 | Cai | F02C 9/54 60/773 |
| 2015/0315766 | A1 * | 11/2015 | Take | F02D 41/0205 701/22 |
| 2016/0149524 | A1 * | 5/2016 | Fukushige | H02P 21/0089 318/400.41 |
| 2016/0214727 | A1 * | 7/2016 | Hamel | B64D 27/18 |
| 2016/0257416 | A1 * | 9/2016 | Himmelmann | B64D 27/02 |
| 2017/0073065 | A1 * | 3/2017 | Von Novak | B64C 27/08 |
| 2017/0341227 | A1 * | 11/2017 | Sentis | H02K 5/20 |

OTHER PUBLICATIONS

International Search Report and Written Opinion for App. Ser. No. PCT/US17/57326, dated Jun. 21, 2018, 9 pages.

International Preliminary Report on Patentability for App. No. PCT/US17/57326, dated Apr. 23, 2019, 7 pages.

* cited by examiner

HYBRID POWER SYSTEM CHARACTERIZATION

CLAIM OF PRIORITY

This application claims priority to U.S. Provisional Application No. 62/410,632, filed on Oct. 20, 2016, the contents of which are incorporated here by reference in their entirety.

TECHNICAL FIELD

This disclosure relates to a measuring the power of an energy source, such as a combustion engine.

BACKGROUND

Power and torque can be measured to determine the performance of engines such as combustion engines.

SUMMARY

In an aspect, a system includes a torque sensor; and a hybrid power system. The hybrid power sensor includes a frame; an engine mounted on the frame; and a generator, the generator including: a generator rotor mechanically coupled to a shaft of the engine; and a generator stator coupled to the frame by the torque sensor. The torque sensor is configured to measure a torque on the generator stator.

Embodiments can include one or more of the following features.

The system includes a device configured to measure an electrical output of the generator. The system includes a computing system configured to determine a mechanical output power of the engine based on the measured torque and a number of revolutions per minute of the engine; and map the mechanical output power of the engine to the electrical output of the generator.

The system includes an electric load electrically connected to the generator. The electric load comprises a time-varying electric load. The electric load comprises an electric motor. The electric load comprises an electric motor and a propeller driven by the electric motor. The electric motor comprises a brushless direct current motor. The system includes a control system configured to control a speed of the electric motor. The electric load is selected based on a characteristic of an unmanned aerial vehicle.

The engine comprises a reciprocating piston engine. The generator comprises a permanent magnet multi-pole generator. The generator produces an alternating current output, and the system includes a rectifier configured to convert the alternating current output from the generator into direct current.

The generator rotor is mechanically coupled to the shaft of the engine by a flexible coupling, such as a polyurethane coupling.

The system includes an unmanned aerial vehicle, wherein the hybrid power system is mounted on the unmanned aerial vehicle.

In an aspect, a method includes operating a hybrid power system including a frame; an engine mounted on the frame; and a generator, the generator including: a generator rotor mechanically coupled to a shaft of the engine; and a generator stator coupled to the frame. The method includes, during operation of the hybrid power system, measuring (i) a torque on the generator stator using a torque sensor coupling the generator stator to the frame and (ii) an electrical output of the generator.

Embodiments can include one or more of the following features.

The method includes determining a mechanical output power of the engine based on the measured torque and a number of revolutions per minute of the engine. The method includes mapping the mechanical output power of the engine to the electrical output of the generator. The method includes varying an electric load electrically connected to the generator. The method includes mapping the mechanical output power of the engine to the electrical output of the generator as a function of the varying electric load. The electric load comprises an electric motor and a propeller driven by the electric motor. The method includes varying the electric load comprises controlling a speed of the electric motor. The method includes identifying a particular number of revolutions per minute of the engine at which the mechanical output power of the engine is a maximum. The method includes controlling operation of the generator based on the particular number of revolutions per minute at which the mechanical output power is a maximum. The method includes determining an indicator of an efficiency of the engine.

DETAILED DESCRIPTION

In the testing of internal combustion engines and systems, dynamometers are often used to characterize the performance of the engines. Dynamometers are mechanical systems that apply a controlled load either directly to the engine of interest, or indirectly through the output transmission of that a machine to which the engine is attached. The dynamometer concurrently applies an active load to the engine or system while measuring an output, such as torque and speed (typically revolutions per minute, rpm), of the system. The active load applied by the dynamometer can take many mechanical or electrical forms. Mechanical loads can include, e.g., mechanical friction brakes, water brakes, hydraulic loads, and air brakes. Electrical loads can include, e.g., electric motors, pumps, and generators. Engines are typically tested across at least a portion of the full range of output speeds and power levels.

In the case of automobiles, engines may be tested as a single component to understand and quantify their output characteristics. Automobiles can be tested using dynamometers that test the output power at the driving wheels output to more fully quantify the performance of the engine, transmission, and drive system. In this case, the dynamometer can both apply the active load and measure the speed and output torque of the system.

A virtual dynamometer can be used for qualification and/or quantification of small hybrid power systems. In small hybrid power systems, a rotor of an electric generator is typically directly coupled to an output shaft of an engine, such as an internal combustion engine. The engine is mounted on a frame structure that is directly coupled to the generator stator (e.g., the generator housing). This frame structure provides structural rigidity that helps prevent torque load on the generator stator from the rotating rotor.

In a virtual dynamometer, a reactionary torque sensor is placed in the mechanical path between the frame and the generator stator. A reactionary torque sensor is a frame component that contains strain sensors that can measure the total torque on a component (typically a column with flanges on either end) while remaining mechanically stiff under load. By mounting the torque sensor between the generator stator and the frame, the real time output power of the internal combustion engine can be measured using the torque measurement and the engine speed. With the torque sensor mounted directly in the fixed frame path, the dynamic behavior of the engine shaft and generator rotor is not affected.

The electrical power produced by the hybrid power system can be directed to an electrical load that duplicates the end application. This electrical power can be measured at various points in the electrical load to further qualify the static and dynamic response of the system and load to understand various load components, such as rectification and motor control. Through this method, the system response of the hybrid power units can be studied and optimized for various applications, e.g., for use in unmanned aerial vehicles or remote power applications.

For small engines, it can sometimes be difficult to fully qualify the engine due to engine mounting, coupling and/or loading methods. If the engine of interest is loaded in a different manner than that of its actual use, the testing process may not provide an accurate result compared to actual conditions of use. If the active load or mechanical characteristics (e.g., impedance) of the dynamometer are different from the actual end application, then the results can be misleading. In the case of small hybrid power systems in which an engine is directly coupled to a generator, a mechanical load on the system will generally have a different rotary inertia and mechanical stiffness than the load of the actual generator. These differences can lead to testing errors in the quantification of steady state operations as well as in the dynamic response of the system to varying loads.

Figure 1:
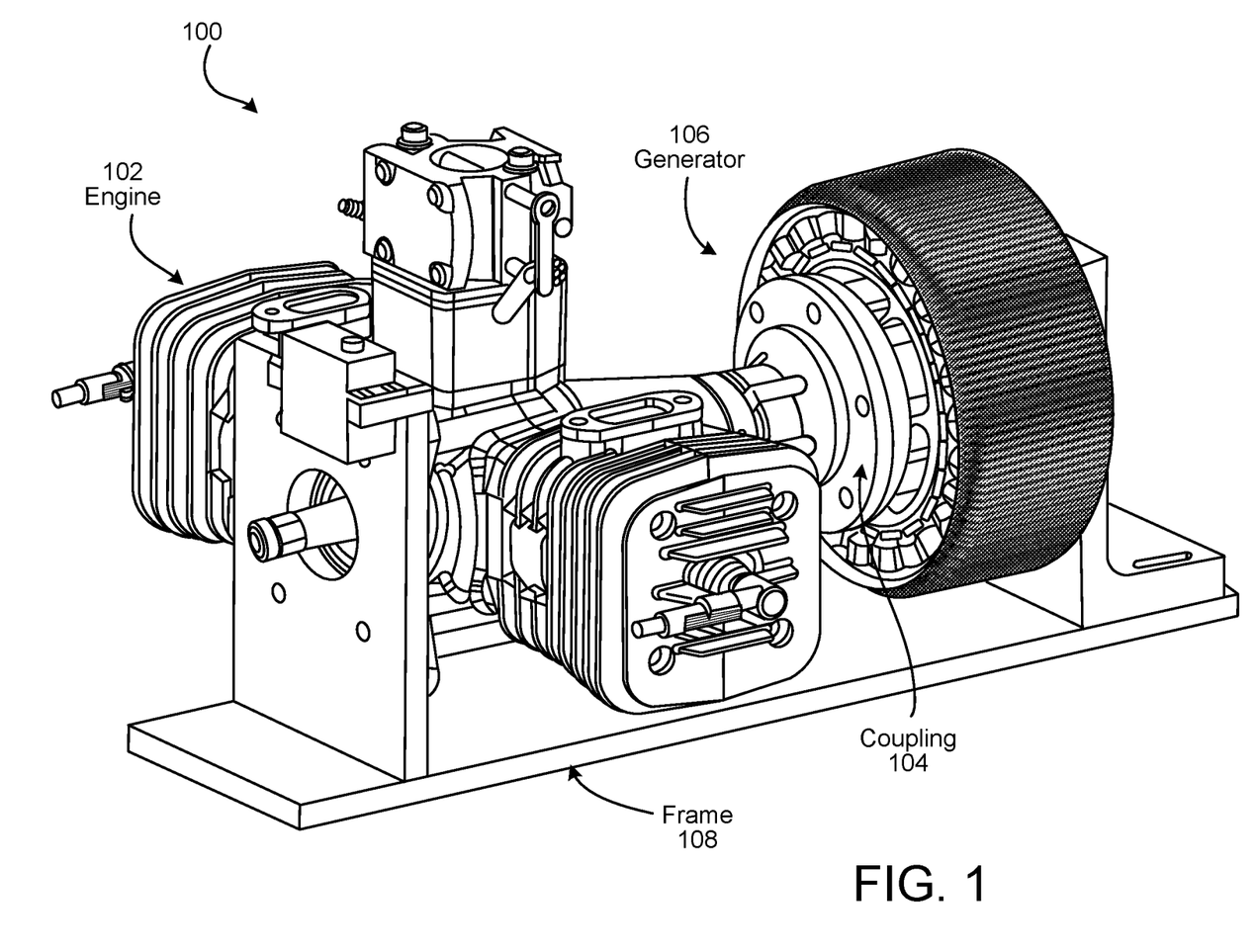
FIG. 1 illustrates a small hybrid generator system.
Figure 2:
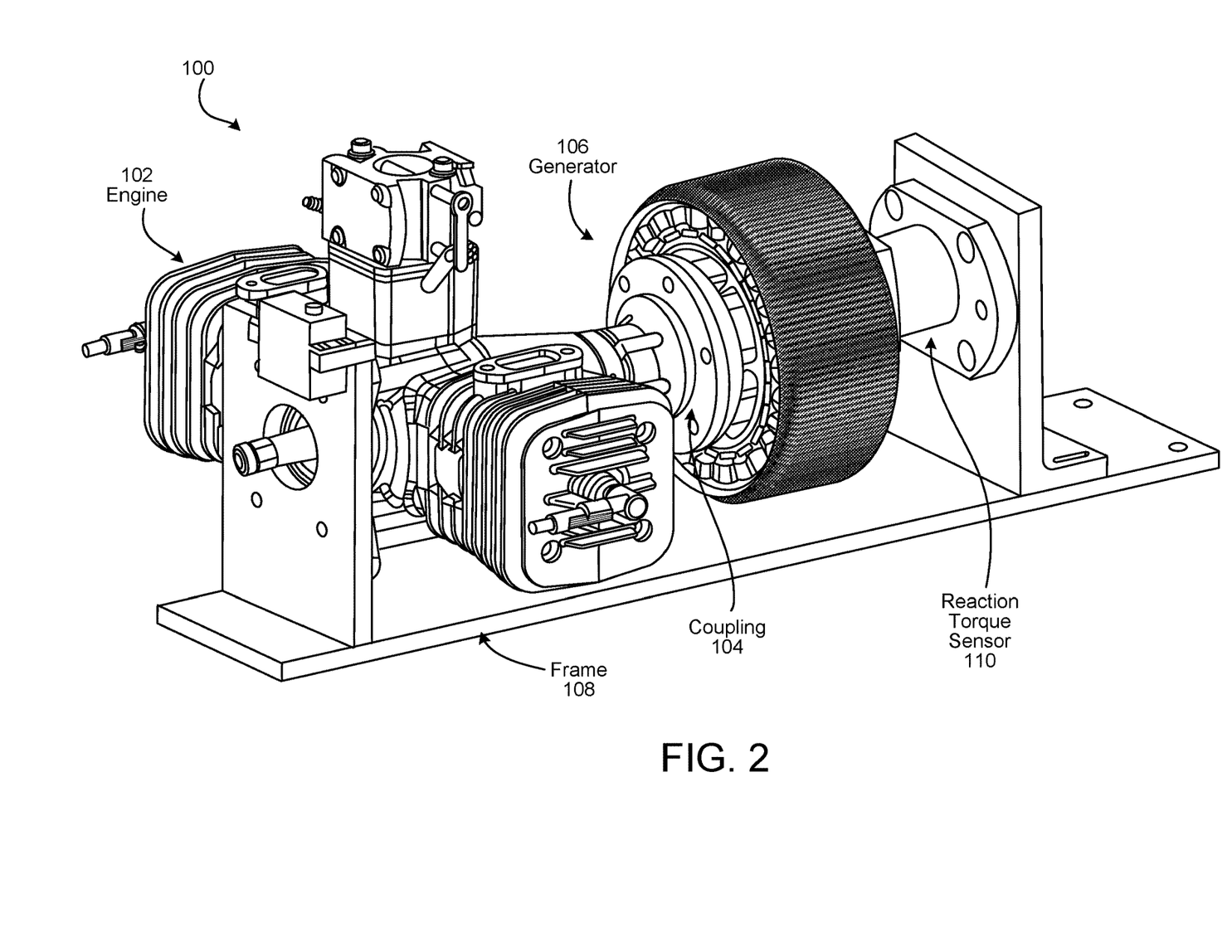
FIG. 2 illustrates a reaction torque sensor included in a hybrid generator system.

The following description shows the detailed layout of a virtual dynamometer. In FIG. 1, a small hybrid power system 100 is shown. The hybrid power system 100 includes an engine 102, such as a reciprocating piston engine, a coupling 104, a generator 106, such as a permanent magnet multi-pole generator, and a frame 108. In FIG. 2, the same small hybrid power system 100 is shown, and includes a reaction torque sensor 110 mounted between the generator 106 housing and the frame 108. The output power from the generator 106 can be a 3 phase alternating current (AC) output that is passed into a diode rectifier (not shown) to produce a direct current (DC) electrical supply. This DC supply can then be passed into any of a variety of electrical loads. The revolutions per minute (rpm) of the engine 102 can be measured along with the reaction torque on the generator 106 housing. These measurements can be used to yield the instantaneous mechanical output power of the engine 102, e.g., by determining a product of the rpm and the reaction torque. The electrical output power of the generator 106 can be calculated by measuring the output voltage and current from the generator 106. Comparing the mechanical power output from the engine 102 and the electrical power from the generator 106 can yield information on the efficiency of the generator 106.

The electrical output from the generator 106 can be passed to a controllable electric load, such as a resistors bank, an electric motor, or another type of load. By varying the electric load, the hybrid power system 100 performance can be quantified and optimized for a given end application. For instance, most internal combustion engines have a power curve that peaks at a certain rpm. Above and below this certain rpm, the output power at the engine shaft will be lower than its peak. At the certain rpm, the generator will produce a voltage and current output. Typically, the voltage output is dependent on the rpm and the output current will adjust according to the electrical load. By configuring a control system of the hybrid power system to operate at a fixed rpm independent of load, the output voltage to the system will remain approximately constant, independent of the load. As the electrical load increases, the engine will thus be constrained to provide more mechanical power at the same rpm to keep the supply voltage constant. This condition will continue until the peak power output rating of the engine or the generator is obtained. In some examples, the power ratings of the generator and the engine can be matched. Operating at full load at the peak power rpm of the engine will deliver the highest power/weight ratio of the hybrid power unit. The generator design can be modified to provide the desired voltage and current at this peak power rpm.

When qualifying or characterizing the hybrid power system using a virtual dynamometer, the electrical load can be representative of actual conditions. One example of an electric load is a resistance bank, however, these types of systems are often hard to adjust under high current loads (e.g., upwards of 200+ amps). Resistor networks can be adjusted for total load by changing parallel and serial configurations and/or adding or removing resistors. Other components, such as rheostats, variable resistors, etc., can be used for fine load adjustment.

Another example of an electric load can be a motor/propeller assembly, e.g., an assembly that is the same as or behaviorally similar to a motor/propeller assembly for an end use unmanned aerial vehicle. For instance, using multiple brushless DC motors coupled with electronic speed controls allows the hybrid power system to be loaded in a continuous curve from low level power to peak power output. Multiple units of a motor, a propeller, and a speed control unit can be configured to handle a variety of possible power levels. Dynamic load changes can be produced to study the dynamic load performance of the hybrid power system. This approach can also be used to model and/or test engine control system and software.

Figure 3:
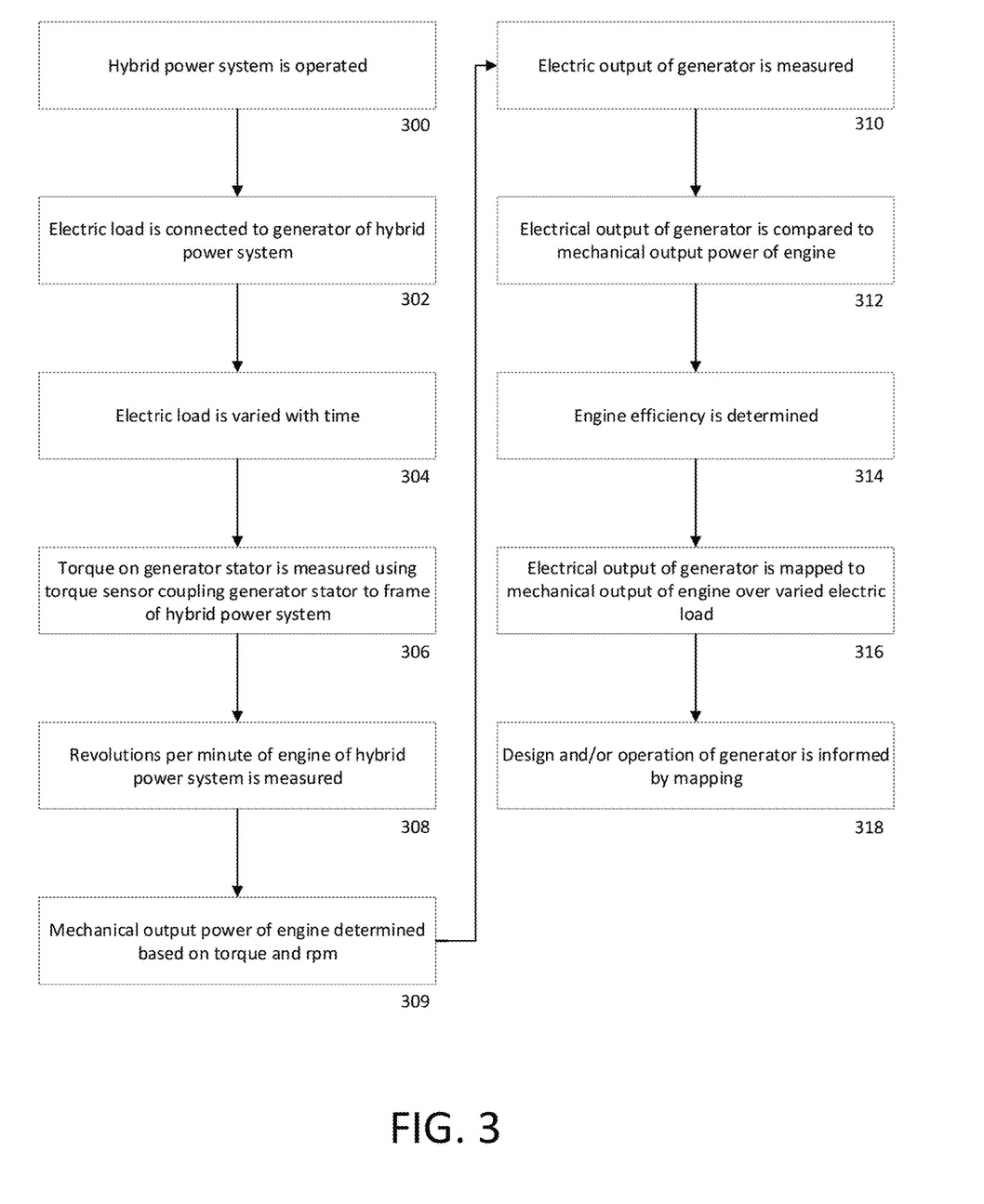
FIG. 3 is a flow chart.

The installation of a reactionary torque sensor into a direct drive hybrid power system allows for characterization of the performance and power output across the full power band under both static and dynamic load conditions. By measuring the reactionary torque and motor shaft rpm, the mechanical output power of the engine can be mapped to the electrical output of the generator. Engine efficiency can be calculated and improved and the generator design can be adjusted to better match the engine performance. Use of dynamic electrical loads that match the end use goals can be used during testing to tune the engine control system to enable hybrid power system and flight propulsion system to be developed that are well suited for end use goals. Referring to FIG. 3, in an example method, a hybrid power system is operated (300). The hybrid power system includes a frame, an engine mounted on the frame, and a generator. The generator includes a generator rotor mechanically coupled to a shaft of the engine, e.g., via a flexible coupling, such as a polyurethane coupling. The generator includes a generator stator coupled to the frame, e.g., by a reaction torque sensor.

An electric load is electrically connected to the generator (302). The electric load can be, e.g., an electric motor that drives a propeller. In some examples, the electric load is varied (304).

During operation of the hybrid power system, a torque on the generator stator is measured using the reaction torque sensor coupling the generator stator to the frame (306). The number of revolutions per minute of the engine shaft is also measured (308), and a mechanical output power of the engine is determined based on the torque and the revolutions per minute of the engine (309). An electrical output of the generator is measured (310) and compared to the mechanical output power (312). An efficiency of the engine can be determined based on the comparison (314). In some examples, when the electric load is varied, the electrical output of the generator can be mapped to the mechanical output power across the varied electric load (316). The design and/or operation of the generator can be informed by the mapping of the electrical output of the generator to the mechanical output power (318).

The hybrid generator system provides a portable hybrid generator power source with energy conversion efficiency, e.g., for use with an unmanned aerial vehicle (UAV). The hybrid generator system can include two systems. A first system includes a gasoline powered engine coupled to a generator motor and can serve as a primary source of energy, e.g., electrical energy, of the hybrid generator system. A second system can include a high energy density rechargeable battery. Together, the first system and the second system combine to form a high energy continuous energy source with high peak power availability for a load, such as the UAV. For instance, the first power system provides electrical energy to rotor motors of the UAV and/or to the rechargeable battery. The rechargeable battery can also provide electrical energy to the rotor motors of the UAV. In some examples, one of the first power system and the second power system can serve as a back-up power source of the hybrid generator system if the other power system experiences a failure.

Figure 4:
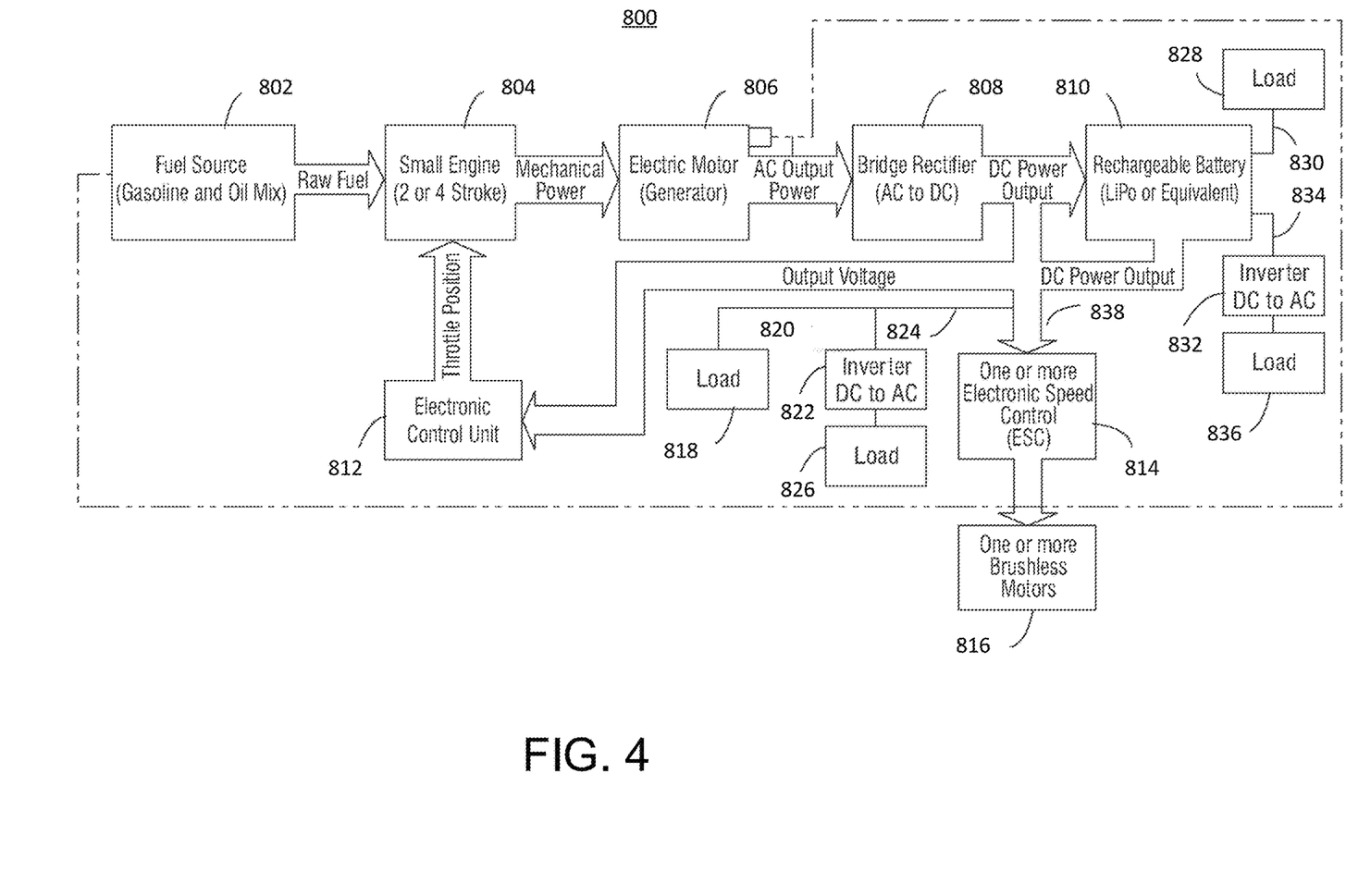
FIG. 4 depicts a diagram of an example hybrid generator system.

FIG. 4 is a diagram of an example hybrid generator system 800. The hybrid generator system 800 includes a fuel source 802, e.g., a vessel for storing gasoline, a mixture of gasoline and oil, or another fuel or mixture of fuels. The fuel source 802 provides fuel to an engine 804 of a first power system. The engine 804 uses the fuel from the fuel source 802 to generate mechanical energy. The engine 804 is sized and dimensioned to fit onto the UAV. In some examples, the engine 804 can be a small, 2- or 4-stroke engine. The first power system of the hybrid generator system 800 also includes a generator 806 coupled to the engine 804. The generator 806 generates alternating current (AC) electrical energy from the mechanical energy generated by the engine 804

The hybrid generator system 800 includes a rechargeable battery 810, such as a lithium polymer battery or a lithium sulfur battery, that is coupled to the generator motor 806 by a bridge rectifier 808. The bridge rectifier 808 converts the AC electrical energy output from the generator motor 806 to direct current (DC) electrical energy. The DC energy from the bridge rectifier 808 can be used to charge the rechargeable battery 810, to provide DC energy to a load 818 via a line 820, or to provide energy to a DC-to-AC inverter 822 via line 824 and thus to provide AC energy to a load 826. The rechargeable battery 810 can provide DC power to a load 828 via a line 830 or to a DC-to-AC inverter 832 via a line 834 to provide AC power to a load 836.

In some examples, an output of the bridge rectifier 808 and/or the rechargeable battery 810 is provided via a line 838 to one or more electronic speed control devices (ESC) 814 integrated in one or more rotor motors 816 of the UAV. The ESC 814 can control the DC electrical energy provided by the bridge rectifier 808 and/or the rechargeable battery 810 to the rotor motors 816. In some examples, active rectification can be applied to improve efficiency of the hybrid generator system. In some examples, the ESC 814 can control an amount of energy provided to the rotor motors 816 in response to input received from an operator, e.g., controlling a flight path of a UAV.

The hybrid generator system 800 includes an electronic control unit (ECU) 812, which can be implemented as a computer system including a processor, memory, non-volatile storage, and an interface. The ECU 812 is coupled to the bridge rectifier 808 and the rechargeable battery 810. The ECU 812 can be configured to measure the AC voltage of the output of the generator motor 806, which is directly proportional to the revolutions per minute (RPM) of the engine 804; and to compare the AC voltage output to the DC voltage output of the bridge rectifier 808. The ECU 812 can control the throttle of the engine 804 to cause the DC voltage output of the bridge rectifier 808 to increase or decrease as the load changes, e.g., a load of one or more of the rotor motors 816 or one or more of loads 818, 826, 828, and 836.

Figure 5A:
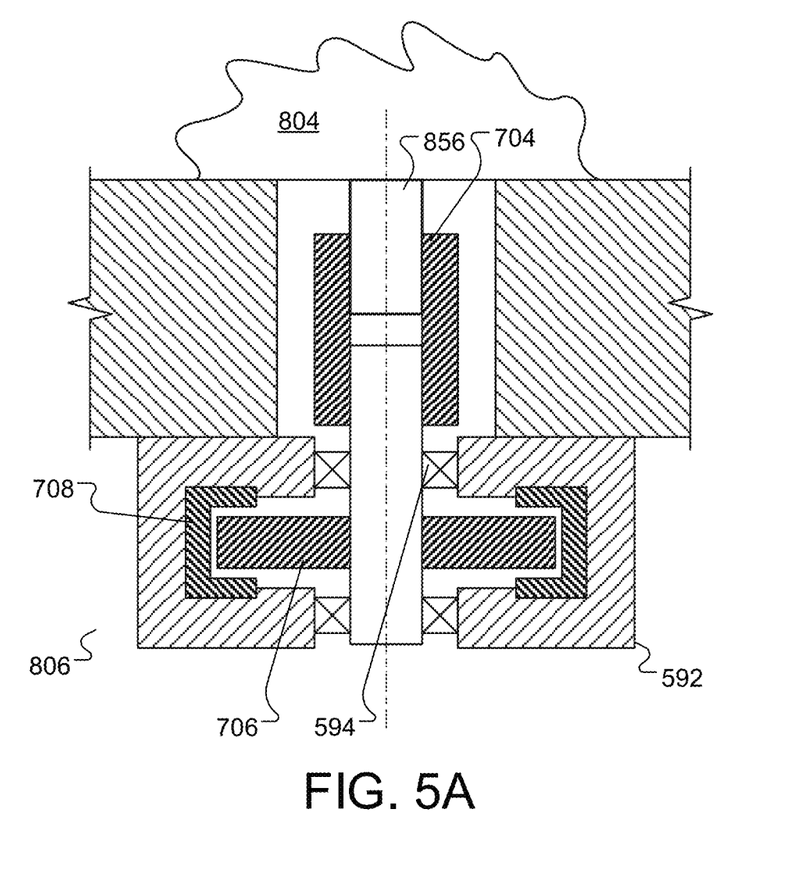
FIGS. 5A and 5B are diagrams of portions of a hybrid generator system.

Referring to FIG. 5A, in some examples, the generator motor 806 is coupled to the engine 804 through a flexible, direct coupling 704, such as a polyurethane coupling. In particular, the generator motor 806 includes a generator rotor 706 and a generator stator 708 housed in a generator body 592. The generator rotor 706 is attached to the generator body 592 by generator bearings 594. The generator rotor 706 is coupled to an engine shaft 856 via the coupling 704. Direct coupling can contribute to the reliability of the first power system, which in turn enables the hybrid generator system to operate continuously for long periods of time at high power. In addition, direct coupling can contribute to the durability of the first power system, thus helping to reduce mechanical creep and fatigue even over many engine cycles, such as millions of engine cycles. Direct coupling between the engine 804 and the generator motor 806 can enable the first power system to be a compact, lightweight power system having a small form factor. A compact and lightweight power system can be readily integrated into the UAV.

Figure 5B:
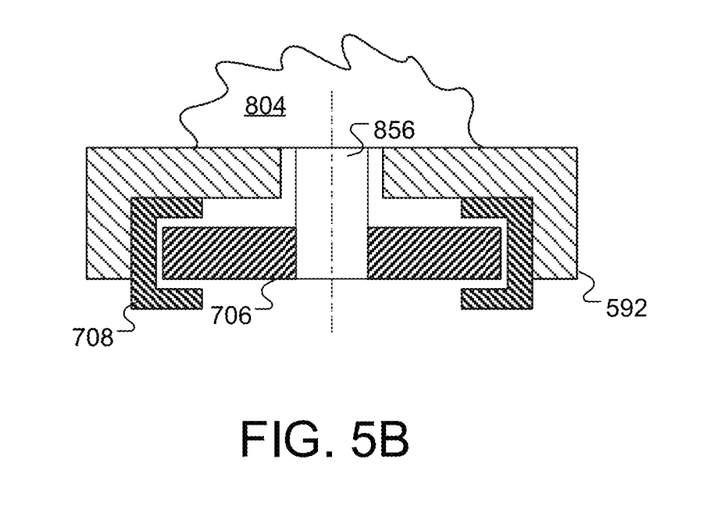

Referring to FIG. 5B, in some examples, a frameless or bearing-less generator 858 can be used instead of a urethane coupling between the generator motor and the engine 804. For instance, the bearings (594 in FIG. 5A) on the generator can be removed and the generator rotor 706 can be directly mated to the engine shaft 856. The generator stator 708 can be fixed to a frame 860 of the engine 816. This configuration prevents over-constraining the generator with a coupling while providing a small form factor and reduced weight and complexity.

In some examples, thermal management strategies can be employed to actively or passively cool components of the hybrid generator system. High power dense components tend to overheat, e.g., because thermal dissipation is usually proportional to surface area. In addition, internal combustion is an inherently inefficient process, which creates heat. Active cooling strategies can include fans, such as a centrifugal fan. The centrifugal fan can be coupled to the engine shaft so that the fan spins at the same RPM as the engine, thus producing significant air flow. The centrifugal fan can be positioned such that the air flow is directed over certain components of the engine, e.g., the hottest parts of the engine, such as the cylinder heads. Air flow generated by the flying motion of the UAV can also be used to cool the hybrid generator system. For instance, air pushed by the rotors of the UAV (referred to as propwash) can be used to cool components of the hybrid generator system. Passive cooling strategies can be used alone or in combination with active cooling strategies in order to cool components of the hybrid generator system. In some examples, one or more components of the hybrid generator system can be positioned in contact with dissipative heat sinks, thus reducing the operating temperature of the components. For instance, the frame of the UAV can be formed of a thermally conductive material, such as aluminum, which can act as a heat sink. In some examples, fins 2302 can be formed on the engine (e.g., on one or more of the cylinder heads of the engine) to increase the convective surface area of the engine, thus enabling increased heat transfer. In some examples, the hybrid generator system can be configured such that certain components are selectively exposed to ambient air or to air flow generated by the flying motion of the UAV in order to further cool the components.

Figure 6:
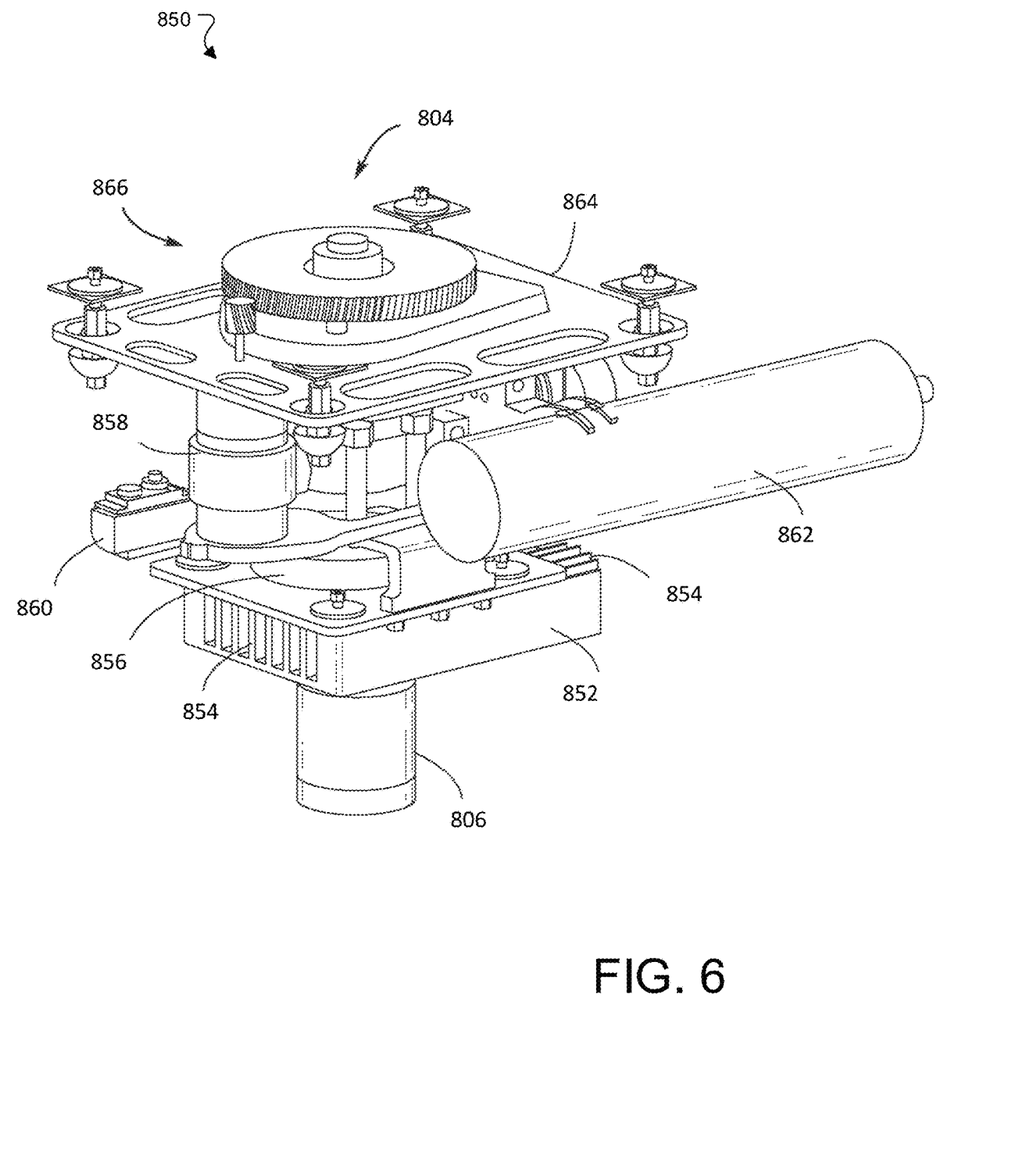
FIG. 6 depicts a side perspective view of a hybrid generator system.
Figure 7A:
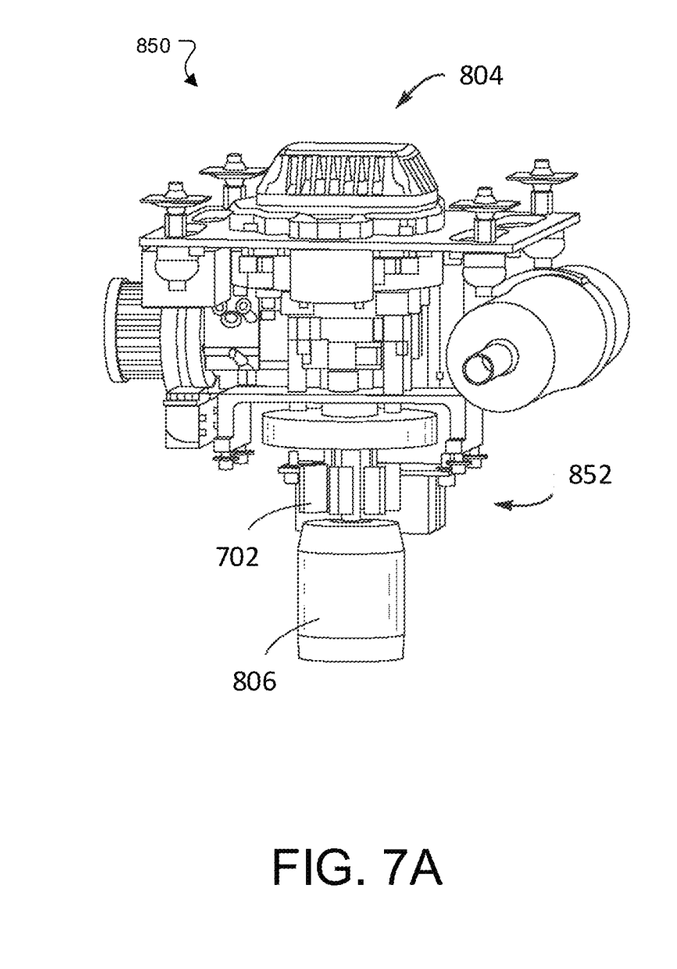
FIGS. 7A and 7B depict a side view and an exploded side view, respectively, of a hybrid generator.
Figure 7B:
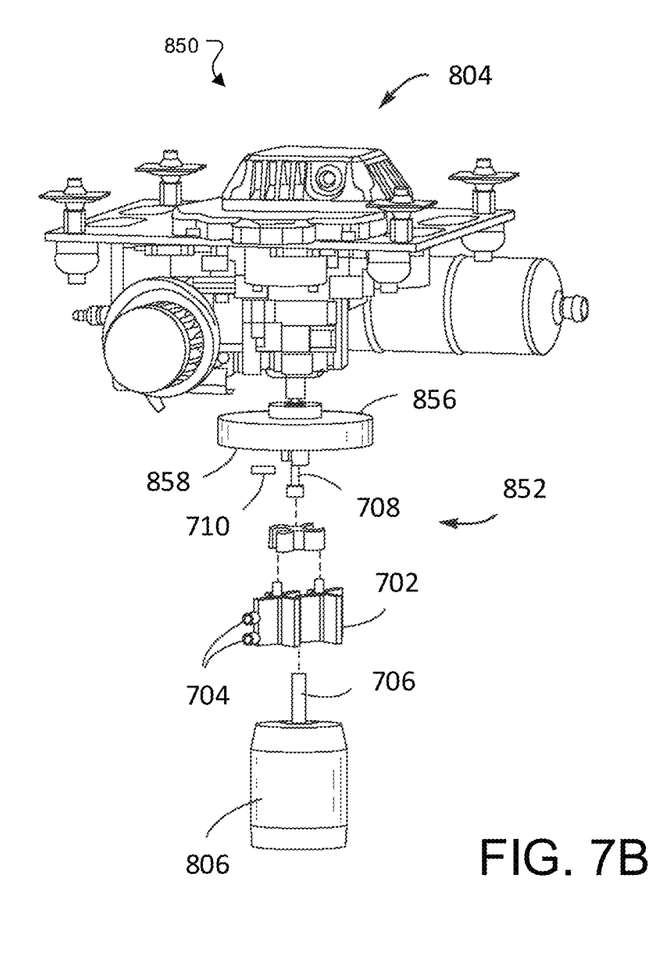

In some examples, a shaft of the engine 804 and/or a coupling device between the engine and the generator includes a fan that is positioned and oriented to dissipate heat away from the engine 804 and/or the generator motor 806. For instance, FIGS. 6, 7A, and 7B are a side perspective view, a side view, and an exploded side view of an example hybrid generator system 850. In the hybrid generator system 850, the engine 804 includes a coupling and cooling device 852 that mechanically couples the shaft of the generator motor 806 to the shaft of the engine 804 and also provides cooling with sink fins 854. Referring specifically to FIGS. 7A and 7B, in some examples, the coupling and cooling device 852 can include a coupling fan 702 including set screws 704 that couple a shaft 706 of the generator motor 806 and a shaft 708 of the engine 804. In some examples, the coupling and cooling device 852 can include a rubber coupling ring. In some examples, the hybrid generator system 800 can include components to facilitate transfer of heat away from the hybrid generator system 800. For example, the hybrid generator system 800 can include cooling fins on specific components, e.g. the rectifier, to transfer heat away from the hybrid generator system. In some examples, the hybrid generator system 800 can be integrated into a UAV in a configuration that enables airflow over components that produce heat, e.g., to cause heat to be transferred toward the exterior of the UAV.

The engine 804 can include a fly wheel 856 to reduce reduces mechanical noise and/or engine vibration. The engine 804 can include a Hall Effect sensor 710 and a Hall Effect magnet coupled to the fly wheel 856. When the engine 804 is operational, the fly wheel 856 spins and generates a voltage that is directly proportional to the revolutions per minute of the fly wheel 856. This voltage is measured by the Hall Effect sensor 710 and is input into the, which can control the throttle of either or both of the generator motor 806 and the engine 804 based on a comparison between the measured voltage and the voltage output by the generator motor 806. In some examples, the engine 804 can include additional components, such as a starter motor 858, a servo 860, a muffler 862, and a vibrational mount 864.

In some examples, the hybrid generator system 800 can be integrated into a UAV using a dual vibration damping system, e.g., including couplings to couple the engine to the frame of the UAV. The couplings can be flexible couplings, such as urethane couplings. For instance, the engine 804 can mounted on the UAV via a vibration isolation system that enables sensitive components of the UAV to be isolated from vibrations generated by the engine. The vibration isolation system can include vibration damping mounts that attach the engine to the frame of the UAV. The vibration damping mounts allow the engine 804 to oscillate independently from the frame of the UAV, thus preventing vibrations from being transmitted from the engine to other components of the UAV. The vibration damping mounts can be formed from a robust, energy absorbing material such as rubber, that can absorb the mechanical energy generated by the motion of the engine without tearing or ripping, thus preventing the mechanical energy from being transferred to the rest of the UAV. In some examples, the vibration damping mounts can be formed of two layers of rubber dampers joined together rigidly with a spacer. The length of the spacer can be adjusted to achieve a desired stiffness for the mount. The hardness of the rubber can be adjusted to achieve desired damping characteristics in order to absorb vibrational energy.

Figure 8:
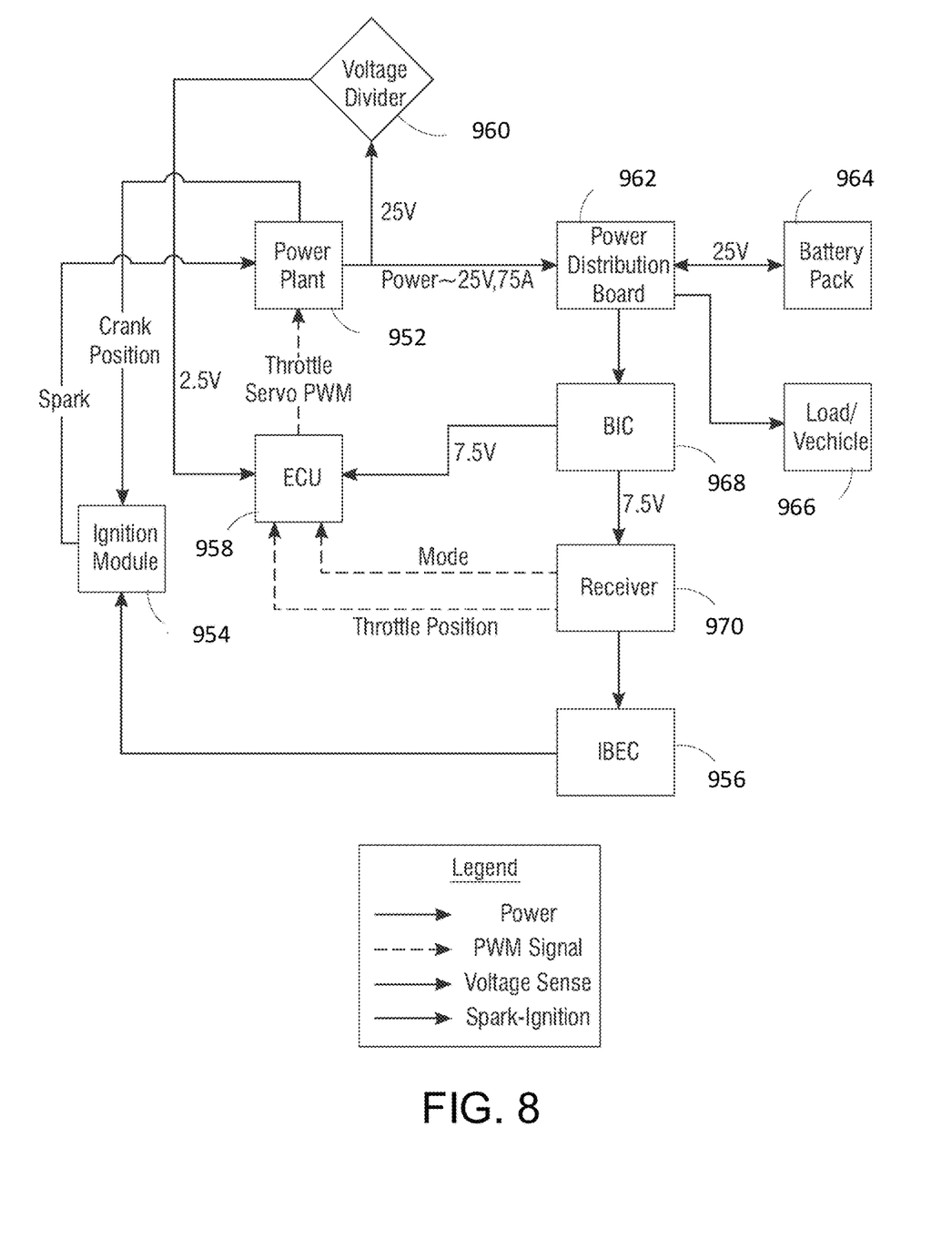
FIG. 8 shows a control system of a hybrid generator system.

FIG. 8 shows a control system of a hybrid generator system. The hybrid generator system includes a power plant 952, which includes an engine and a generator, coupled to an ignition module 954. The ignition module 954 functions to start the power plant 952 by providing a physical spark to the power plant 954. The ignition module 954 is coupled to an ignition battery eliminator circuit (IBEC) 956. The IBEC 956 functions to power the ignition module 954. The power plant 952 is controlled by an ECU 958, which is coupled to the power plant through a throttle servo that can be operated a throttle of the engine to cause the power plant 952 to increase or decrease an amount of produced power. The ECU 958 is coupled to a voltage divider 960. Through the voltage divider 960, the ECU can determine an amount of power the ECU 958 is generating to determine whether to increase, decrease, or keep a throttle of an engine constant. The power plant is coupled to a power distribution board 962. The power distribution board 962 can distribute power generated by the power plant 952 to either or both a battery pack 964 and a load 966, such as one or more rotor motors of a UAV. The power distribution board 962 is coupled to a battery eliminator circuit (BEC) 968, which provides power to the ECU 958 and a receiver 970. The receiver 970 controls the IBEC 956 and causes the IBEC 956 to power the ignition module 954. The receiver 970 also sends information to the ECU 958 used in controlling a throttle of the engine of the power plant 952.

Figure 9:
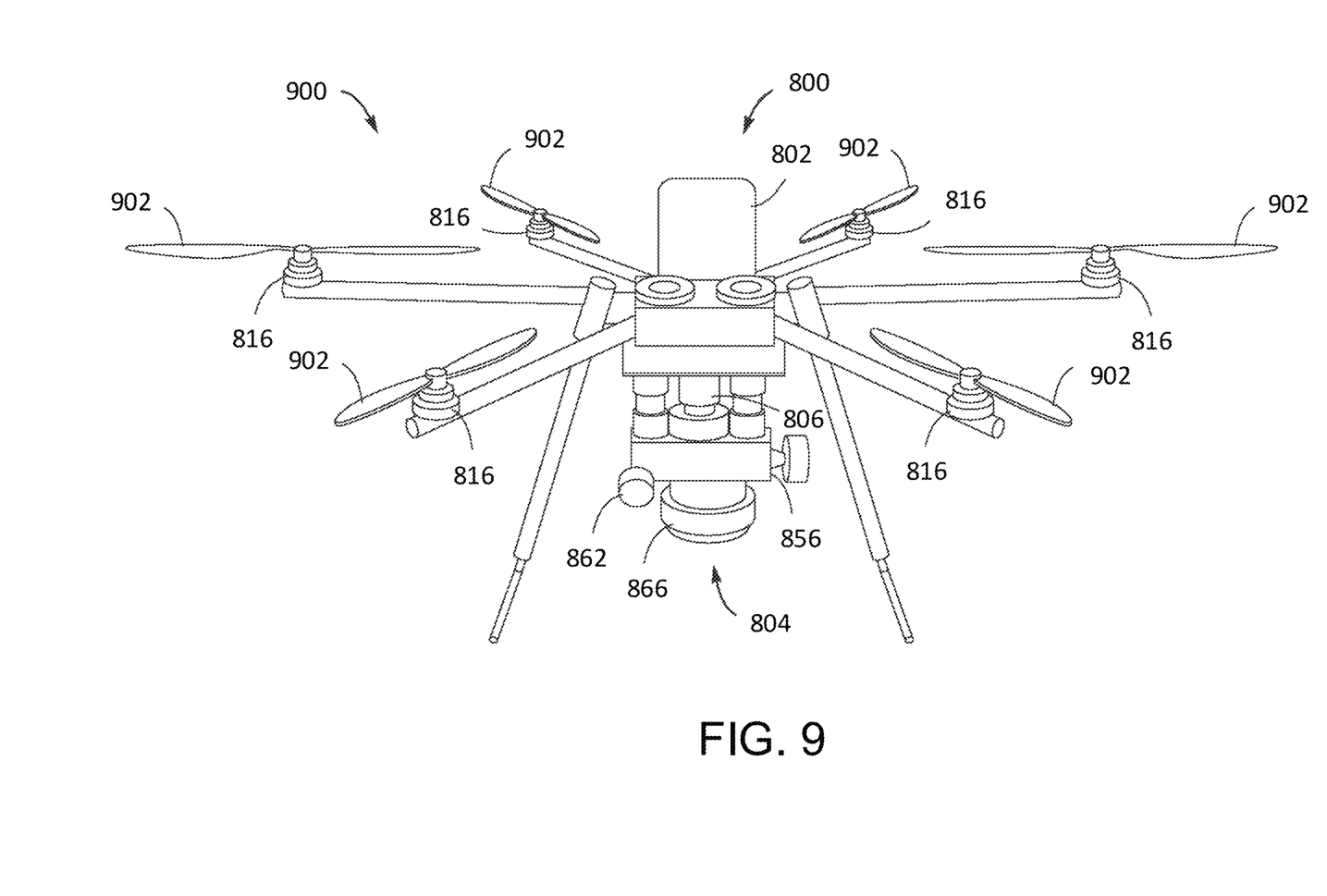
FIG. 9 is a perspective view of a UAV integrated with a hybrid generator system.

FIG. 9 is a perspective view of the hybrid generator system 800 integrated with a UAV 900. The UAV 900 includes six rotor motors 816 each coupled to a corresponding propeller 902 The hybrid generator system 800 can provide energy to sustain flight of the UAV 900. In some examples, the hybrid generator system 800 can act as a primary source of energy for another load when the UAV 900 has reached its destination and is not in flight, e.g., one or more of the external loads 818, 826, 828, and/or 836 of FIG. 4. The loads can be loads on board the UAV 900 or off of the UAV. The loads can include sensors, computing devices, robotic devices, or other types of loads.

In some examples, the UAV uses the power provided by the hybrid generator system to travel from an initial location to a remote location and then generate power for general use at the new location. For instance, the ability to provide power at a remote location can be useful for supplying power to deployed armed forces, in humanitarian or disaster relief situations in which transportation of a generator and/or fuel is challenging, or in other situations in which no power or insufficient power is available to satisfy a request for power.

In some examples, a hybrid energy generation system includes one or more detachable subsystems, such as a ground or aerial robot, data storage equipment, communications equipment, sensors, or other items. The detachable subsystems can be connected to the hybrid energy generation system via a tether for transmission of power and/or data. Both the hybrid energy generation system and the one or more detachable subsystems can be integrated into a UAV.

Figure 10A:
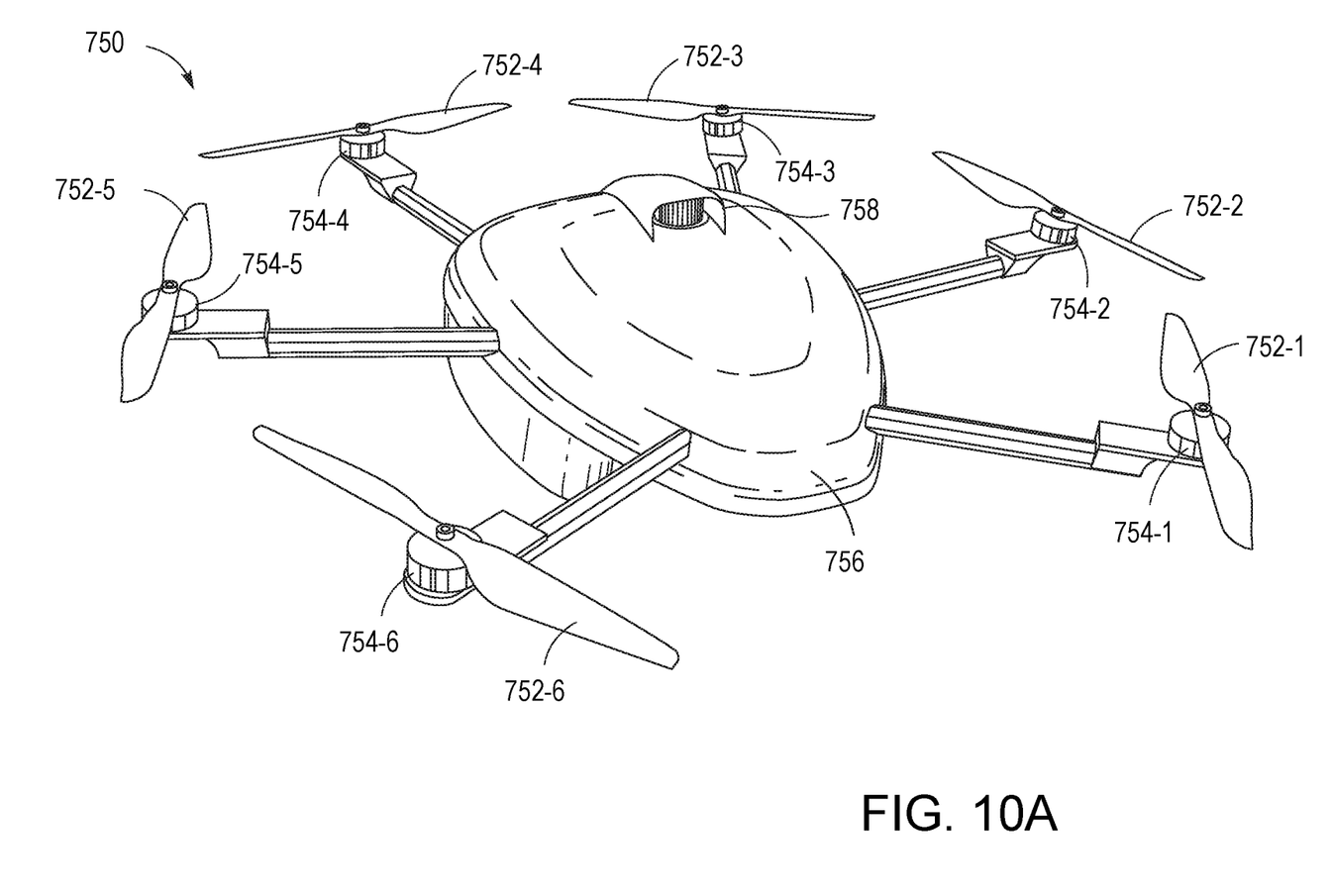
FIGS. 10A-10C are diagrams of a UAV.

FIG. 10A is a view of a top portion 750 of a UAV powered by a hybrid generator system. The UAV includes six rotors 752-1 . . . 752-6 (hereinafter "rotors 752") that are driven by corresponding motors 754-1 . . . 754-6 (hereinafter "motors 754"). The motors 754 can be powered through a hybrid generator system. A top surface 756 of the UAV can have curved edges to reduce air drag and improve aerodynamic performance of the drone. The top surface 756 can include an opening 758 through which air can flow to dissipate heat from at least a portion of the hybrid generator system.

Figure 10B:
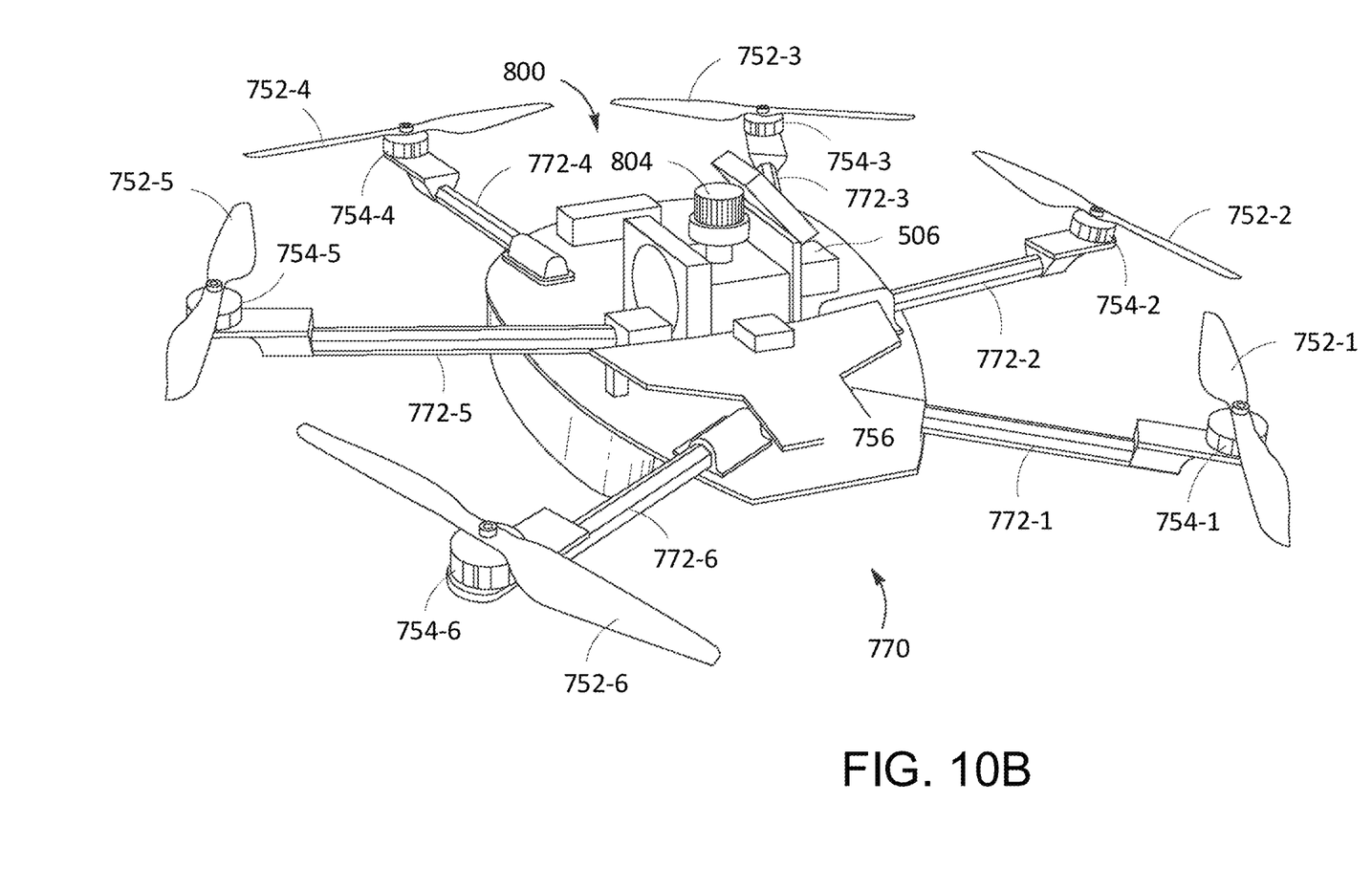
Figure 10C:
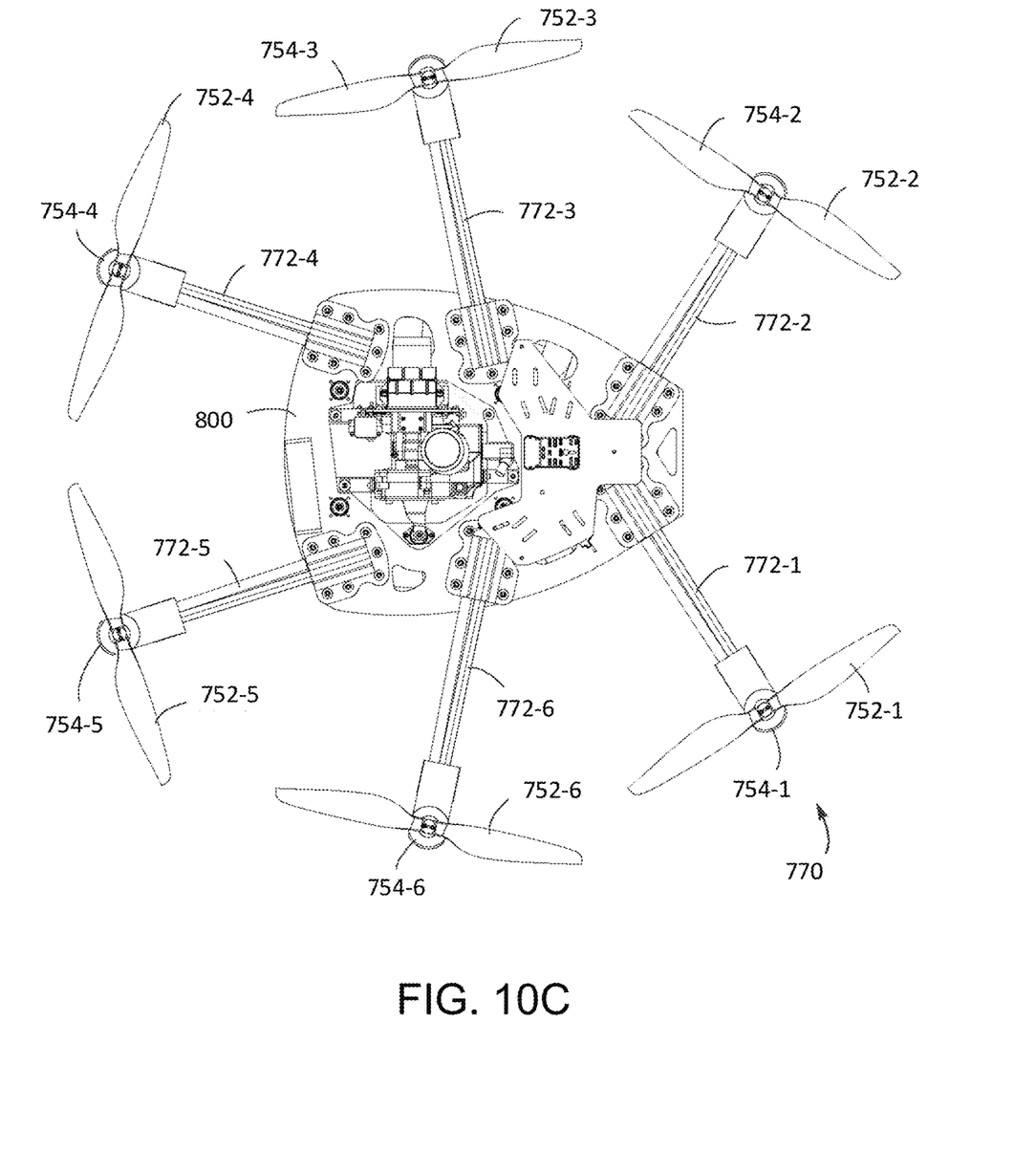

FIG. 10B is a view of a bottom portion 770 of a UAV powered by the hybrid generator system 800 including the engine 804 and the generator motor 806. FIG. 10C shows a top view of an interior of a UAV powered by the hybrid generator system 800. The rotor motors 754 and corresponding rotors 752 are positioned away from a main body of a bottom portion 770 of the drone by arms 772-1 . . . 772-6 (hereinafter "arms 772"). An outer surface of the bottom portion 770 of the UAV and/or the arms 772 can have curved edges to reduce air drag and improve aerodynamic performance of the drone.

In some examples, the materials of the hybrid generator system and/or the UAV itself can be lightweight, such as materials with a high strength-to-weight ratio. Example materials can include aluminum or high strength aluminum alloys (e.g., 7075 alloy), carbon fiber based materials, or other materials. In some examples, components can be designed to reduce the amount of material used for the components, e.g., by designing the components to have increased stiffness or by removing material that is not relevant for the functioning of a component. Further description of UAVs and hybrid generator systems can be found in U.S. Pat. No. 9,751,625, the contents of which are incorporated here by reference in their entirety. Other embodiments are within the scope of the following claims.

What is claimed is:

1. A system comprising:
   a torque sensor; and
   a hybrid power system comprising:
      a frame;
      an engine mounted on the frame;
      a generator, the generator including:
         a generator rotor mechanically coupled to a shaft of the engine; and
         a generator stator coupled to the frame by the torque sensor;
   wherein the torque sensor is configured to measure a value of a torque on the generator stator applied by the engine.

2. The system of claim 1, comprising a device configured to measure an electrical output of the generator.

3. The system of claim 2, comprising a computing system configured to:
   determine a mechanical output power of the engine based on the measured value of the torque and a number of revolutions per minute of the engine; and
   map the mechanical output power of the engine to the electrical output of the generator.

4. The system of claim 1, comprising an electric load electrically connected to the generator.

5. The system of claim 4, wherein the electric load comprises a time-varying electric load.

6. The system of claim 4, wherein the electric load comprises an electric motor.

7. The system of claim 6, wherein the electric load comprises the electric motor and a propeller driven by the electric motor.

8. The system of claim 7, wherein the electric motor comprises a brushless direct current motor.

9. The system of claim 8, comprising a control system configured to control a speed of the electric motor.

10. The system of claim 4, wherein the electric load is selected based on a characteristic of an unmanned aerial vehicle.

11. The system of claim 1, wherein the engine comprises a reciprocating piston engine.

12. The system of claim 1, wherein the generator comprises a permanent magnet multi-pole generator.

13. The system of claim 1, wherein the generator produces an alternating current output, and
   comprising a rectifier configured to convert the alternating current output from the generator into direct current.

14. The system of claim 1, wherein the generator rotor is mechanically coupled to the shaft of the engine by a flexible coupling.

15. The system of claim 14, wherein the flexible coupling comprises a polyurethane coupling.

16. The system of claim 1, comprising an unmanned aerial vehicle, wherein the hybrid power system is mounted on the unmanned aerial vehicle.

17. The system of claim 1, wherein the generator stator is coupled to the frame in a substantially fixed orientation by the torque sensor.

18. The system of claim 1, wherein the torque sensor comprises a strain sensor.

19. A method comprising:
   operating a hybrid power system comprising:
      a frame;
      an engine mounted on the frame;
      a generator, the generator including:
         a generator rotor mechanically coupled to a shaft of the engine; and
         a generator stator coupled to the frame; and
   during operation of the hybrid power system, measuring
      (i) a value of a torque on the generator stator applied by the engine using a torque sensor coupling the generator stator to the frame and (ii) an electrical output of the generator.

20. The method of claim 19, comprising determining a mechanical output power of the engine based on the measured value of the torque and a number of revolutions per minute of the engine.

21. The method of claim 20, comprising mapping the mechanical output power of the engine to the electrical output of the generator.

22. The method of claim 21, comprising varying an electric load electrically connected to the generator.

23. The method of claim 22, comprising mapping the mechanical output power of the engine to the electrical output of the generator as a function of the varying electric load.

24. The method of claim 22, wherein the electric load comprises an electric motor and a propeller driven by the electric motor.

25. The method of claim 24, wherein varying the electric load comprises controlling a speed of the electric motor.

26. The method of claim 21, comprising identifying a particular number of revolutions per minute of the engine at which the mechanical output power of the engine is a maximum.

27. The method of claim 26, comprising controlling operation of the generator based on the particular number of revolutions per minute at which the mechanical output power is a maximum.

28. The method of claim 21, comprising determining an indicator of an efficiency of the engine.

29. The method of claim 19, wherein the generator stator is coupled to the frame in a substantially fixed orientation by the torque sensor.

30. The method of claim 19, comprising measuring the value of the torque using a strain sensor.

* * * * *